(12) United States Patent
Hsu

(10) Patent No.: US 7,967,260 B2
(45) Date of Patent: Jun. 28, 2011

(54) SUPPORTING STRUCTURE HAVING FUNCTION OF ROD-LINKAGE LATCHING

(75) Inventor: Yu-Tsun Hsu, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 404 days.

(21) Appl. No.: 12/165,026

(22) Filed: Jun. 30, 2008

(65) Prior Publication Data

US 2010/0006730 A1    Jan. 14, 2010

(30) Foreign Application Priority Data

Dec. 6, 2007 (TW) ................................ 96146452 A

(51) Int. Cl.
*A47F 5/12* (2006.01)
*A47G 29/00* (2006.01)

(52) U.S. Cl. ............... 248/133; 248/371; 248/372.1; 248/922; 248/917

(58) Field of Classification Search .............. 248/371, 248/133, 922, 393, 917, 372.1; 361/679.02
See application file for complete search history.

(56) References Cited

U.S. PATENT DOCUMENTS

| | | | |
|---|---|---|---|
| 6,822,857 B2 | 11/2004 | Jung et al. | |
| 7,404,233 B2 * | 7/2008 | Lu et al. | 16/302 |
| 7,413,152 B1 * | 8/2008 | Chen | 248/176.1 |
| 7,431,254 B2 * | 10/2008 | Cheng | 248/292.12 |
| 7,494,104 B2 * | 2/2009 | Baek | 248/372.1 |
| 7,513,468 B2 * | 4/2009 | Jung et al. | 248/133 |
| 7,567,436 B2 * | 7/2009 | Jeong | 361/679.22 |
| 7,690,605 B2 * | 4/2010 | Lee et al. | 248/133 |
| 7,694,929 B2 * | 4/2010 | Jang | 248/372.1 |

* cited by examiner

*Primary Examiner* — Anita M King
(74) *Attorney, Agent, or Firm* — Guice Patents PLLC

(57) ABSTRACT

The present invention relates to a supporting structure having function of rod-linkage latching which comprises a connecting unit, a base seat, a base seat hinge, a main hinge, at least one rod-linkage mechanism and at least one rod-linkage latching device. By providing a rod-linkage latching device between a connecting unit and a rod-linkage mechanism the two connecting rods of the rod-linkage mechanism generate a relative movement while the connecting unit performs tilt angle adjusting toward the base seat, so a tenon sheet of one connecting rod is moved and a latching member of the rod-linkage latching device loses stop and extends then the movement of the tenon sheet is limited thus a locking status is formed, so a torsion spring disposed between the connecting unit and the base seat is pressed so an energy saving status is formed, therefore the connecting unit has a certain angle with respect to the base seat and an advantage of saving volume while packaging and conveying is achieved, and the supporting structure provided by the present invention can be disposed vertically or be hanged.

7 Claims, 10 Drawing Sheets

SUPPORTING STRUCTURE HAVING FUNCTION OF ROD-LINKAGE LATCHING

BACKGROUND OF THE INVENTION

1. Field of the Invention

The present invention relates to a supporting structure, more particularly to a supporting structure having function of rod-linkage latching, a rod-linkage mechanism is latched or released by a rod-linkage latching device so as to suppress or release an elastic force of a torsion spring disposed between a connecting unit and a base seat.

2. Description of Related Art

Flat panel monitors, e.g. liquid crystal monitors, liquid crystal displays or plasma TVs, have advantages of light in weight, thin and no radiation, etc., and are used to replace conventional CRT monitors. When viewing, the liquid crystal and the plasma monitors have limitations of viewing angles, so a structure of rotation shaft is often provided between the an above mentioned monitor and a base seat for providing a function of adjusting elevation angle of the monitor, with respect to the base seat.

But the described fashion can not provide functions of ascent/descent and forward/backward movement to the flat panel monitors. Auxiliary connecting units disposed in parallel are therefore invented, and two end sections of the two auxiliary connecting units are respectively connected between a main hinge at an upper portion of a connecting unit and a base seat hinge at the lower portion of the connecting unit. For instance, in the patent, CN 1244852C, granted by China government on Mar. 8, 2006 (corresponding to the U.S. Pat. No. 6,822,857) titled in "Monitor improved in a tilting structure", the elements numbered as 100 and 110 shown in FIG. 5 of the patent are a pair of auxiliary connecting units parallel to each other. And a four-rod linkage mechanism is formed by the pair of auxiliary connecting units, a main hinge and a base seat hinge of the connecting unit, so the rotation movement of the connecting unit, with respect to the base seat unit, is converted into a tilt movement of a monitor main body by the auxiliary connecting units. In other words, in order to adjust the height of the monitor main body, while the monitor main body is tilted by the connecting unit in an up/down direction, only a second and a third friction springs (sleeve tubes) connected to a main supporting rack rotate around a third and a fourth hinge pins, so when moving, the angle of the monitor main body is remained.

At least a torsion spring is provided between the connecting unit and the base seat hinge of the base seat provided by the above mentioned patent, and two ends of the torsion spring respectively lean against the base seat hinge and the connecting unit, so a reaction force with the direction opposite to the forward rotation of the monitor main body connected to the connecting unit is formed. Therefore, with providing of the torsion springs, the connecting unit has a tilt angle, with respect to the base seat. But during hanging or packaging and conveying the supporting structure, the tilting status of the connecting unit would result in occupying extra space; if the connecting unit is forced to rotate toward the base seat and being positioned, the elastic forces of the torsion springs are needed to be overcome. So how to provide a latching mechanism between the connecting unit and the base seat to allow the connecting unit rotates toward the base seat to a positioning location so a latch is automatically formed and to further suppress the reaction forces of the torsion springs is still an issue needed to be solved.

SUMMARY OF THE INVENTION

The applicant of the present invention is a skilled person in the art of designing and commercially distributing rotation shafts, supporting structures of flat panel monitors, who has been devoting himself to overcome reaction forces of torsion springs disposed between a base seat and a connecting unit of a conventional supporting structure, which results in generating a tilting status of the connecting unit with respect to the base seat, and further occupying an extra space; and to provide a rod-linkage latching device on a rod-linkage mechanism between the connecting unit and the base seat for latching or releasing the rod-linkage mechanism and further influencing operations the rod-linkage mechanism and a base seat hinge and a main hinge. After time and efforts, the present invention, "Supporting structure having function of rod-linkage latching" is provided.

The object of the present invention is to provide a rod-linkage latching device between a connecting unit and a rod-linkage mechanism, so when the connecting unit is adjusted the tilt angle thereof toward a base seat, a relative movement formed by two connecting rods of the rod-linkage mechanism allows a tenon sheet of one of the two connecting rods moves, therefore a latching member of the rod-linkage latching device loses stop thereof and extends, thus the tenon sheet is not able to move so a locking status is formed, torsion springs disposed between the connecting unit and the base seat are further pressed to form an energy saving status, so the connecting unit has a certain angle with respect to the base seat, e.g. 0 degree at which the connecting unit and the base seat are parallel to each other so during conveying the material volume is reduced.

For achieving the object mentioned above, the present invention provides a supporting structure having rod-linkage latching, comprises: a connecting unit having a top end and a bottom end and at least one lateral end thereof is axially provided with an accommodating space; a base seat; a base seat hinge rotatably provided between the bottom end of the connecting unit and the base seat, at least one torsion spring is pivotally provided between the connecting unit and the base seat so the tilting angle of the connecting unit can be adjusted with respect to the base seat; a main hinge rotatably provided between the top end of the connecting unit and a main supporting rack; at least one rod-linkage mechanism provided parallel to the connecting unit and composed by a top and a bottom connecting rods parallel to each other, two ends of each connecting rods are respectively pivotally connected to the base seat hinge and the main hinge, and one of the two connecting rods is, with respecting to the location of the accommodating space, radially and extrudedly provided with a tenon sheet; at least one rod-linkage latching device which is a latching member combines with a resilient unit, and is provided in the accommodating space of the connecting unit so the latching member can elastically be in contact with the tenon sheet, and the latching member is provided with a releasing member capable of reversely pressing the resilient unit; with the rotation movement of the connecting unit moving toward the base seat, the movement can be converted into a tilt movement of the main supporting rack, so the relative movement generated by the top and the bottom connecting rods allows the tenon sheet simultaneously moves, therefore the latching member loses the stop from the tenon sheet then extends, and the tenon sheet is latched for forming a locking status, so the torsion spring disposed between the connecting unit and the base seat is pressed so an energy saving status is formed, and the connecting unit has a certain angle with respect to the base seat.

Another object of the present invention is to provide a supporting structure having function of rod-linkage latching, comprises: a connecting unit having a top end and a bottom end and at least one lateral end thereof is axially provided with a rod hole having an accommodating space; a base seat; a base seat hinge rotatably provided between the bottom end of the connecting unit and the base seat, at least one torsion spring is pivotally connected between the connecting unit and the base seat so the tilting angle of the connecting unit can be adjusted with respect to the base seat; a main hinge rotatably provided between the top end of the connecting unit and a main supporting rack; at least one rod-linkage mechanism provided parallel to the connecting unit and composed by a top and a bottom connecting rods parallel to each other, two ends of each connecting rods are respectively pivotally connected to the base seat hinge and the main hinge, and one of the two connecting rods is, with respecting to the location of the accommodating space, radially and extrudedly provided with a tenon sheet; at least one rod-linkage latching device which is a resilient unit is provided in an inner end of a rod-shaped latching member, and the resilient unit and the latching member are together disposed in the rod hole, the middle portion of the latching member has a swirl-shaped contact section and the outer end of the latching member has a releasing member capable of reversely pressing the resilient unit, so the swirl-shaped contact section can elastically in contact with and receive the tenon sheet; with the rotation movement of the connecting unit moving toward the base seat, the movement can be converted into a tilt movement of the main supporting rack, so the relative movement generated by the top and the bottom connecting rods allows the tenon sheet simultaneously moves, therefore the swirl-shaped contact section of the latching member loses the stop from the tenon sheet then extends, and the tenon sheet is latched for forming a locking status, so the torsion spring disposed between the connecting unit and the base seat is pressed so an energy saving status is formed, and the connecting unit has a certain angle with respect to the base seat.

Another object of the present invention is to provide a supporting structure having function of rod-linkage latching, comprises: a connecting unit having a top end and a bottom end and at least one base of the lateral end thereof is provided with a concave section having an accommodating space and the lateral end of the concave section has an opening; a base seat; a base seat hinge rotatably provided between the bottom end of the connecting unit and the base seat, at least one torsion spring is pivotally connected between the connecting unit and the base seat so the tilting angle of the connecting unit can be adjusted with respect to the base seat; a main hinge rotatably provided between the top end of the connecting unit and a main supporting rack; at least one rod-linkage mechanism provided parallel to the connecting unit and composed by a top and a bottom connecting rods parallel to each other, two ends of each connecting rods are respectively pivotally connected to the base seat hinge and the main hinge, and one of the two connecting rods is, with respecting to the location of the accommodating space, radially and extrudedly provided with a tenon sheet; at least one rod-linkage latching device, a sheet-shaped latching member is pivotally connected to one end of the concave section, two ends of a resilient unit are respectively connected to the latching member and the concave section, so the latching member can elastically and retractably swings at the opening of the concave section, a pulling sheet is vertically extended from the free end of the latching member and the pulling sheet can reversely press the resilient unit, and a contacting concave slot capable of elastically contacting and receiving is formed at the outer end of the latching member; with the rotation movement of the connecting unit moving toward the base seat, the movement can be converted into a tilt movement of the main supporting rack, so the relative movement generated by the top and the bottom connecting rods allows the tenon sheet simultaneously moves, therefore the contacting concave slot of the latching member loses the stop from the tenon sheet then extends, and the tenon sheet is latched for forming a locking status, so the torsion spring disposed between the connecting unit and the base seat is pressed so an energy saving status is formed, and the connecting unit has a certain angle with respect to the base seat.

To further disclose the substantial art provided by the present invention, firstly please refer to figures, wherein FIG. 1 is a 3D exploded view of the first embodiment of the supporting structure of the present invention; FIG. 2 is a 3D view of the supporting structure after assembled shown in FIG. 1; FIG. 3 is a schematic view of the rod-linkage latching device of the first embodiment before performing locking operation to the rod-linkage mechanism; FIG. 4 is a schematic view of the rod-linkage latching device of the first embodiment after performing locking operation to the rod-linkage mechanism; FIG. 5 is a 3D view of the supporting structure after the rod-linkage latching device of the first embodiment performs locking to the rod-linkage mechanism; FIG. 6 is a 3D exploded view of the second embodiment of the supporting structure of the present invention; FIG. 7 is a 3D view of the supporting structure after assembled shown in FIG. 6; FIG. 8 is a schematic view of the rod-linkage latching device of the second embodiment before performing locking operation to the rod-linkage mechanism; FIG. 9 is a schematic view of the rod-linkage latching device of the second embodiment after performing locking operation to the rod-linkage mechanism; FIG. 10 is a 3D view of the supporting structure after the rod-linkage latching device of the second embodiment performs locking operation to the rod-linkage mechanism.

DETAILED DESCRIPTION OF THE PREFERRED EMBODIMENT

Figure 1:
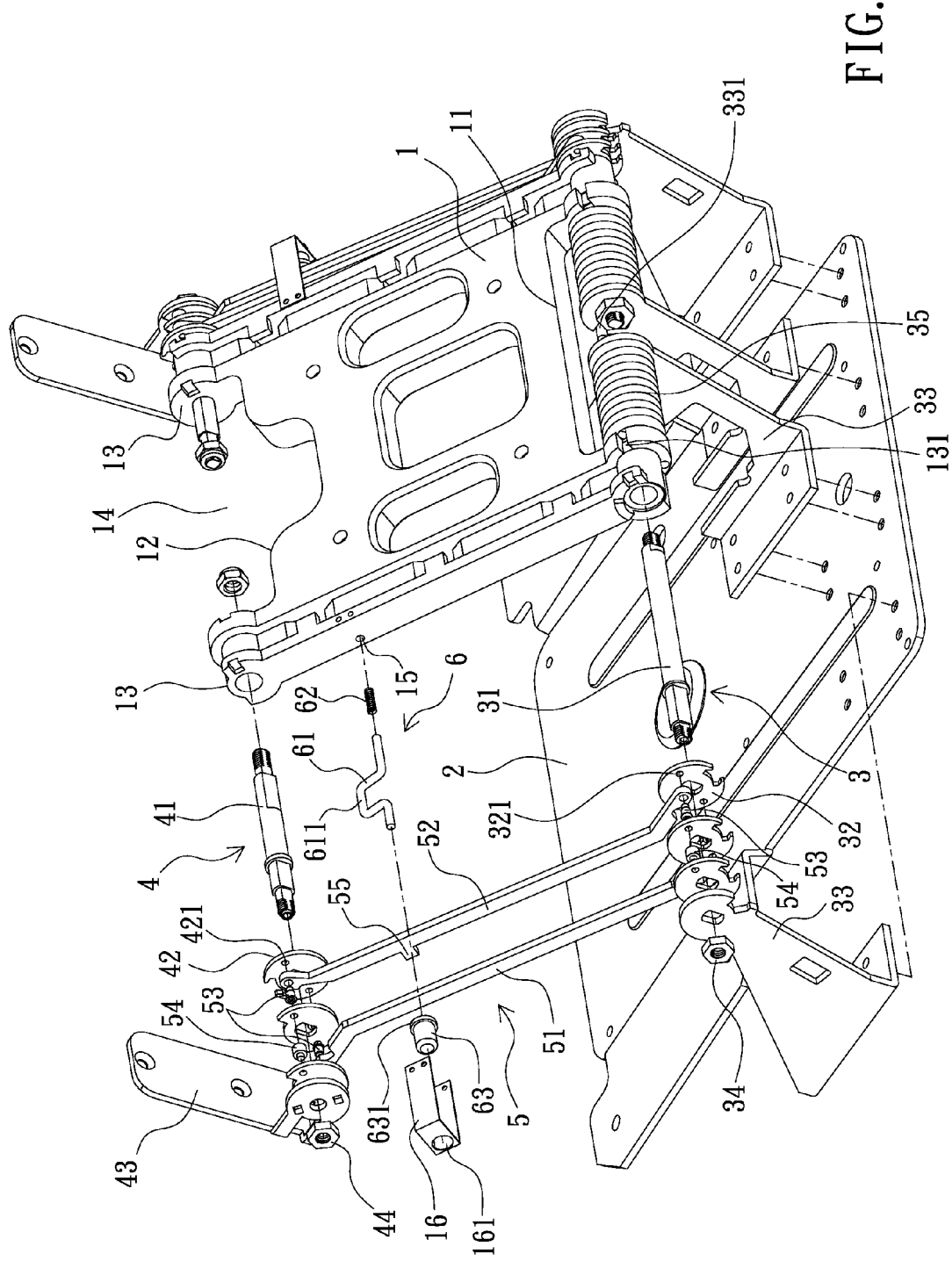
FIG. 1 is a 3D exploded view of the first embodiment of the supporting structure of the present invention.
Figure 2:
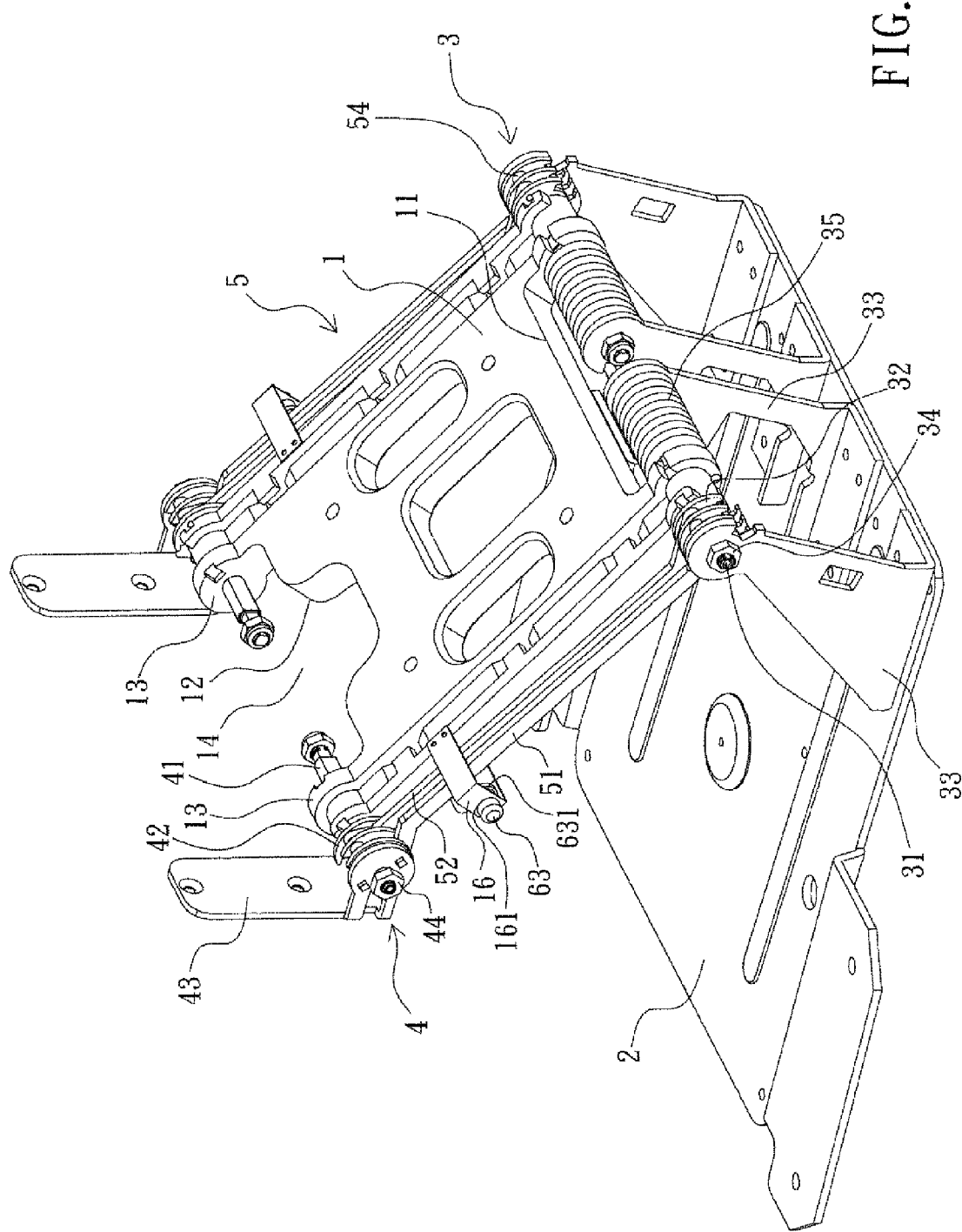
FIG. 2 is a 3D view of the supporting structure after assembled shown in FIG. 1.

As shown in FIG. 1 and FIG. 2, the supporting structure provided by the present invention mainly comprises a connecting unit 1, a base seat 2, a base seat hinge 3, a main hinge 4, at least one rod-linkage mechanism 5 and at least one rod-linkage latching device 6.

The connecting unit 1 is a sheet member, a bottom end 11 and a top end 12 are respectively provided at the bottom and the top of the connecting unit 1 and by pivotally and respectively connecting the base seat hinge 3 and the main hinge 4 to the base seat 2 and an object to be supported e.g. a flat panel monitor, a swingable status is obtained. As shown in FIG. 1, a pair of lugs 13 is respectively extended from two lateral ends of the top end 12 and the bottom end 11, and each pair of the lugs 13 individually has a concave section 14.

The base seat 2 is a flat-sheet member pivotally connected to the connecting unit 1 by the base seat hinge 3, so the tilt angle of the connecting unit 1 can be adjusted with respect to the base seat 2. The base seat 2 can not only be disposed on a plane member e.g. a desk but also be hanged on a wall, so the supporting structure provided by the present invention has dual applications of disposed horizontally and hanged vertically.

The base seat hinge 3 is rotatably provided between the bottom end 11 of the connecting unit 1 and the base seat 2. The base seat hinge 3 is two shaft rods 31 whose one end passes through the lugs 13 and respectively provided with a torsion spring 35 in the concave section 14 of the bottom end 11 of the connecting unit 1, and the other end passes through at least one bottom shaft ring 32, a first bottom supporting rack 33 provided on the base seat 2, so each outer ends of the shaft rods 31 is combined with an end sealing member 34 e.g. an anti-releasing nut, and at least one resilient unit (e.g. a spring or a disc resilient piece) can be provided between the first bottom supporting rack 33 and the end sealing members 34 so as to elastically press the adjacent friction units mentioned above, therefore the connecting unit 1 can have effects of swinging and positioning, with respect to the bottom supporting rack 33.

In order to enhance the supporting effect of the base seat hinge 3 between the connecting unit 1 and the base seat 2, a second bottom supporting rack 33 is provided at the inner end of the torsion spring 35 and the bottom end thereof is connected to the base seat 2 while the top end thereof is served to position the shaft rods 31. Two ends of the torsion spring 35 are respectively retained at a preset rack slot 331 at the periphery of the second bottom supporting rack 33 and a lug slot 131 of the lug 13. The connecting unit 1 rotates between the two bottom supporting racks 33 via the shaft rod 31, so that the torsion spring 35 generates effects of energy saving or releasing.

As shown in FIG. 1, the surface of the shaft rod 31 is provided with a face milling for linking with the bottom shaft rings 32 and is retained between the two bottom supporting racks 33. Each of the shaft rods 31 is provided with one torsion spring 35 so two ends of the torsion springs 35 are respectively retained at the connecting unit 1 and the second bottom supporting rack 33, when the supporting structure provided by the present invention is disposed on a plane the weight of the object to be supported e.g. a flat panel monitor is offset by the elastic force of at least one torsion spring 35. So a user can spend little effort to rotate the connecting unit 1, with respect to the bottom supporting racks 33. Further more, the shaft rod 31 mentioned above does not need to be a pair disposed symmetrically only one shaft rod 31 is also applicable.

The main hinge 4 is rotatably provided between the top end 12 of the connecting unit 1 and the object to be supported. The main hinge 4 is two shaft rods 41 whose one end passes through the lugs 13, and respectively passes through at least one resilient unit e.g. a spring or a disc elastic piece in the concave section 14 of the top end 12, the other end passes through at least a top shaft ring 42 and a top supporting rack 43, and two ends of the shaft rod 41 are respectively connected to an end sealing member 44 e.g. an anti-releasing nut, so as to elastically press the adjacent friction units mentioned above, therefore the top supporting rack 43 can have effects of swinging and positioning, with respect to the connecting unit 1. The top supporting rack 43 and the object to be supported allow the present invention has the expected supporting effect.

A rod-linkage mechanism 5 is provided in parallel on at least one side of the connecting unit 1, as shown in FIG. 1, two sides of the connecting unit 1 are respectively provided with the rod-linkage mechanism 5 that is composed by a top connecting rod 51 and a bottom connecting rod 52 that are parallel to each other. Top and bottom ends of the two connecting rods 51, 52 are respectively transversally and pivotally connected to a shaft pin 53 for connecting with the top shaft rings 42 and the bottom shaft rings 32, of the main hinge 4 and the base seat hinge 3. As shown in FIG. 1, top and bottom ends of the two connecting rods 51, 52 are respectively placed in between the three top shaft rings 42 and the three bottom shaft rings 32, and two radial ends of the shaft rings are respectively provided with a ring hole 421, 321 for respectively receiving the shaft pins 53 of the two connecting rods 51, 52; in order to have a better connection relationship, the adjacent ring holes, that are not pivotally connected, of each two adjacent shaft rings are respectively pivotally provided with an interpose pin 54. Take the three bottom shaft rings 32 of the base seat hinge 3 for instance, the three ring holes 321 are respectively connected in series by an interpose pin 54 and a shaft pin 53 of the bottom connecting rod 52, and a shaft pin 53 of the top connecting rod 51 and an interpose pin 54, so that the top and bottom ends of the two connecting rods 51, 52 are respectively pivotally connected to the three top shaft rings 42 and the three bottom shaft rings 32. So the top and bottom ends of the two connecting rods 51, 52 are pivotally connected to the two opposite ends of the top shaft rings 42 and the bottom shaft rings 32, so a four-rod linkage mechanism is formed.

The feature of the rod-linkage mechanism 5 is that a tenon sheet 55 is extruded from a lateral end of one of the connecting rods, e.g. the bottom connecting rod 52, for achieving effects of locking or releasing with a rod-linkage latching device 6.

The rod-linkage latching device 6 is that a resilient unit 62 is provided in a latching member 61, then the resilient unit 62 and the latching member 61 are disposed at the accommodating space 15 provided at the lateral end of the connecting unit 1, e.g. a rod hole, so the latching member 61 can elastically move within the accommodating space 15, the middle portion of the latching member 61 has a swirl-shaped contact section 611 for receiving and contacting the tenon sheet 55, the outer side of the latching member 61 is provided with a releasing member 63, e.g. a press button, and the inner end of the releasing member 63 is extrudly provided with a flange 631, and let a stopping member 16, e.g. a frame member, passes through the two connecting rods 51, 52 and be retained at the top and bottom sides of the accommodating space 15, a through hole 161 provided axially let the releasing member thrust out and the flange 631 is served as a stop.

As shown in FIG. 2, which is a 3D view of the supporting structure after assembled, the connecting unit 1 is in a tilting status, with respect to the base seat 2, by providing two torsion springs 35 between the connecting unit 1 and the base seat hinge 3, and the main hinge 4 is connected to a flat panel monitor by two top supporting racks 43, so that the assembly of the supporting structure and the object to be supported is finished, then the supporting structure is disposed on a plane.

Figure 3:
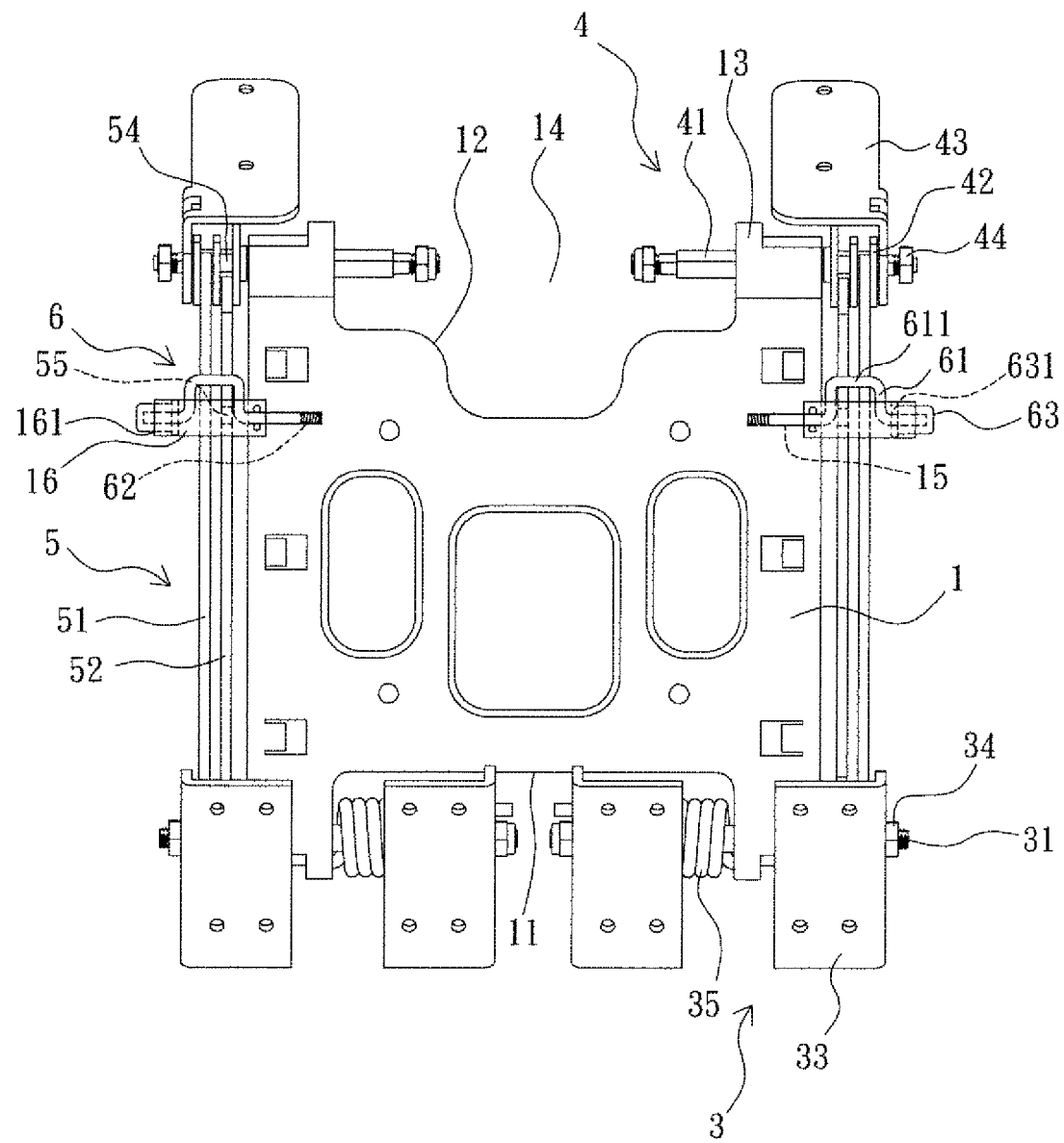
FIG. 3 is a schematic view of the rod-linkage latching device of the first embodiment before performing locking operation to the rod-linkage mechanism.

Referring to FIG. 3, which is a schematic view of the supporting structure as shown in FIG. 2, the inner end of the swirl-shaped contact section 611 of the latching member 61 of the rod-linkage latching device 6 is adjacently connected to the tenon sheet 55 of the bottom connecting rod 52, in other words the rod-linkage mechanism 5 is not locked by the rod-linkage latching device 6 yet, therefore the connecting unit 1 still has the tilt angle adjusting function, with respect to the base seat 2.

Figure 4:
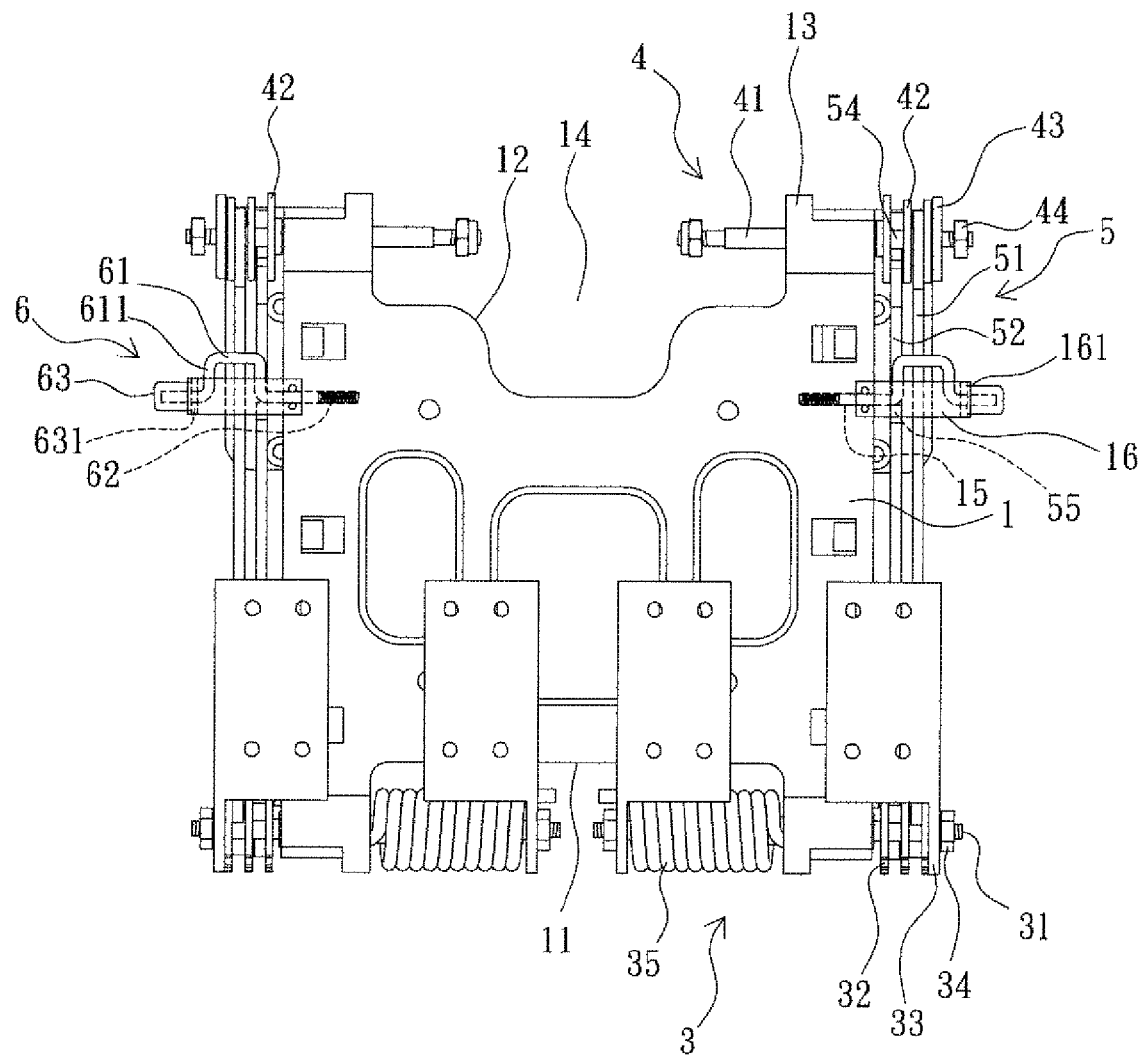
FIG. 4 is a schematic view of the rod-linkage latching device of the first embodiment after performing locking operation to the rod-linkage mechanism.
Figure 5:
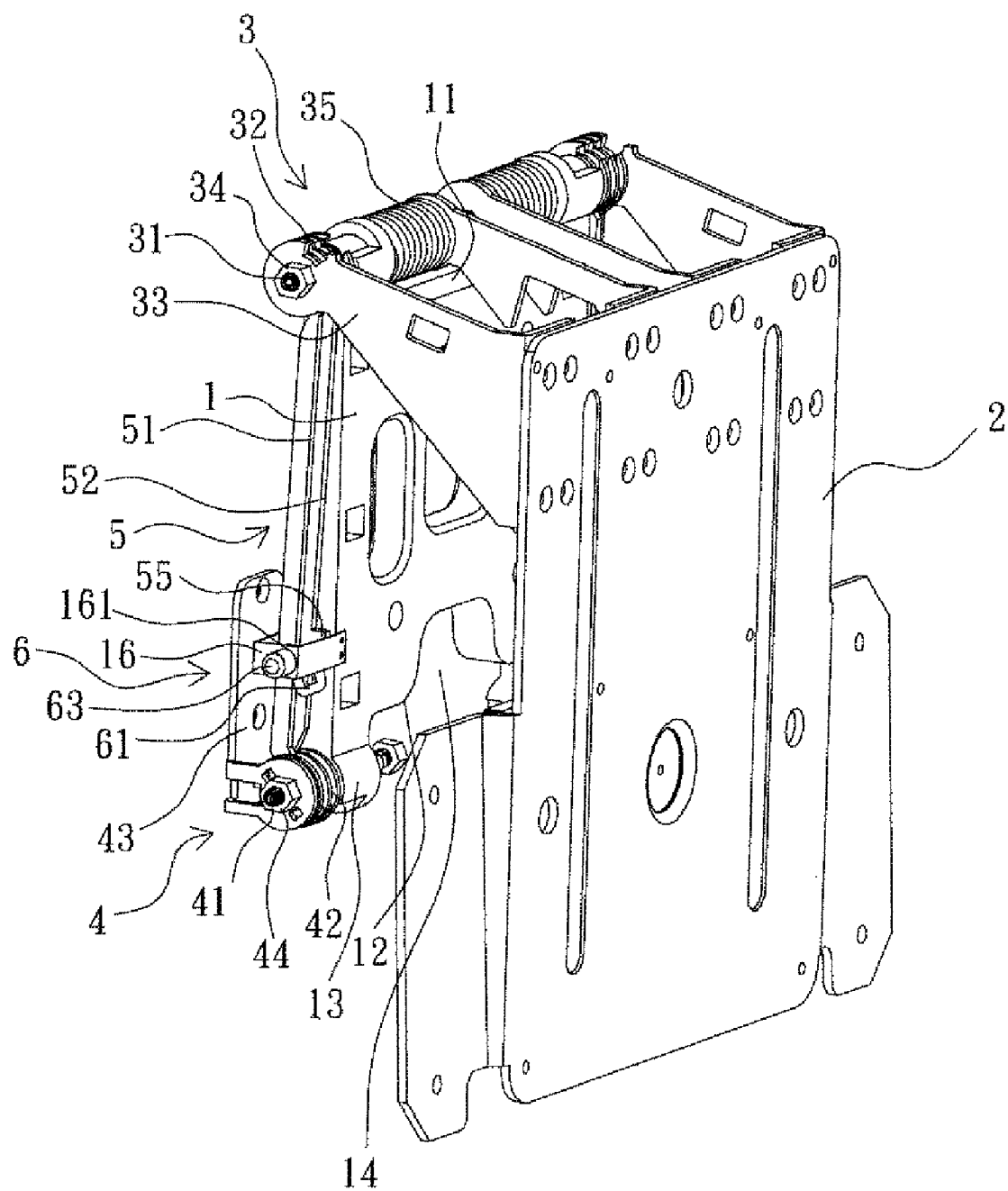
FIG. 5 is a 3D view of the supporting structure after the rod-linkage latching device of the first embodiment performs locking to the rod-linkage mechanism.

Referring to FIG. 4 and FIG. 5, if the supporting structure is desired to be hanged on a wall or be packaged, the connecting unit 1 and the base seat 2 are preferably disposed in parallel for saving space, so the connecting unit 1, with the base seat hinge 3 as an axial center, rotates toward the base seat 2; because the rod-linkage mechanism 5 has already limited the swing radius of the upper portion of the connecting unit 1, when swinging, the two connecting rods 51, 52 generate a relative movement in which one is pulling and the other is pushing, so the shaft rods 41 and the three top shaft rings 42 rotate simultaneously, but the original angle of the flat panel monitor is not effected because the hole provided on the lugs 13 are round holes. The tenon sheet 55 of the bottom connecting rod 52 moves due to the downward pulling movement thus releases from the swirl-shape contact section 611, due to the downward movement of the tenon sheet 55, the latching member 61 outwardly and axially moves so a latch is formed, thus the tenon sheet 55 can not move upwardly so a locking status is formed, and the torsion spring 35 disposed between the connecting unit 1 and the base seat 2 is in an energy saving status, so that the connecting unit 1 has a certain angle, e.g. zero degree, with respect to the base seat 2, and the connecting unit 1 and the base seat 2 can be disposed is in parallel.

For releasing the locking status, just press the releasing member 63 for pressing the latching member 61, the tenon sheet 55 is not longer latched by the latching member 61 and energy is released from the torsion spring 35 so the connecting unit 1 is in a tilting status with respect to the base seat 2, and the top and bottom connecting rods 51, 52 generates a movement in which one is pulling and the other is pushing, then the tenon sheet 55 is forced to move upwardly for limiting the axial movement of the latching member 61.

As shown in FIG. 6 to FIG. 10, which are relevant figures of the second embodiment of the supporting structure provided by the present invention, wherein the connecting unit 1, the base seat 2, the base seat hinge 3, the main hinge 4 and the rod-linkage mechanism 5 in this embodiment are the same as those in the first embodiment, so the same elements are marked with the same numbers; the difference between these two embodiments is the rod-linkage latching device 6.

Figure 6:
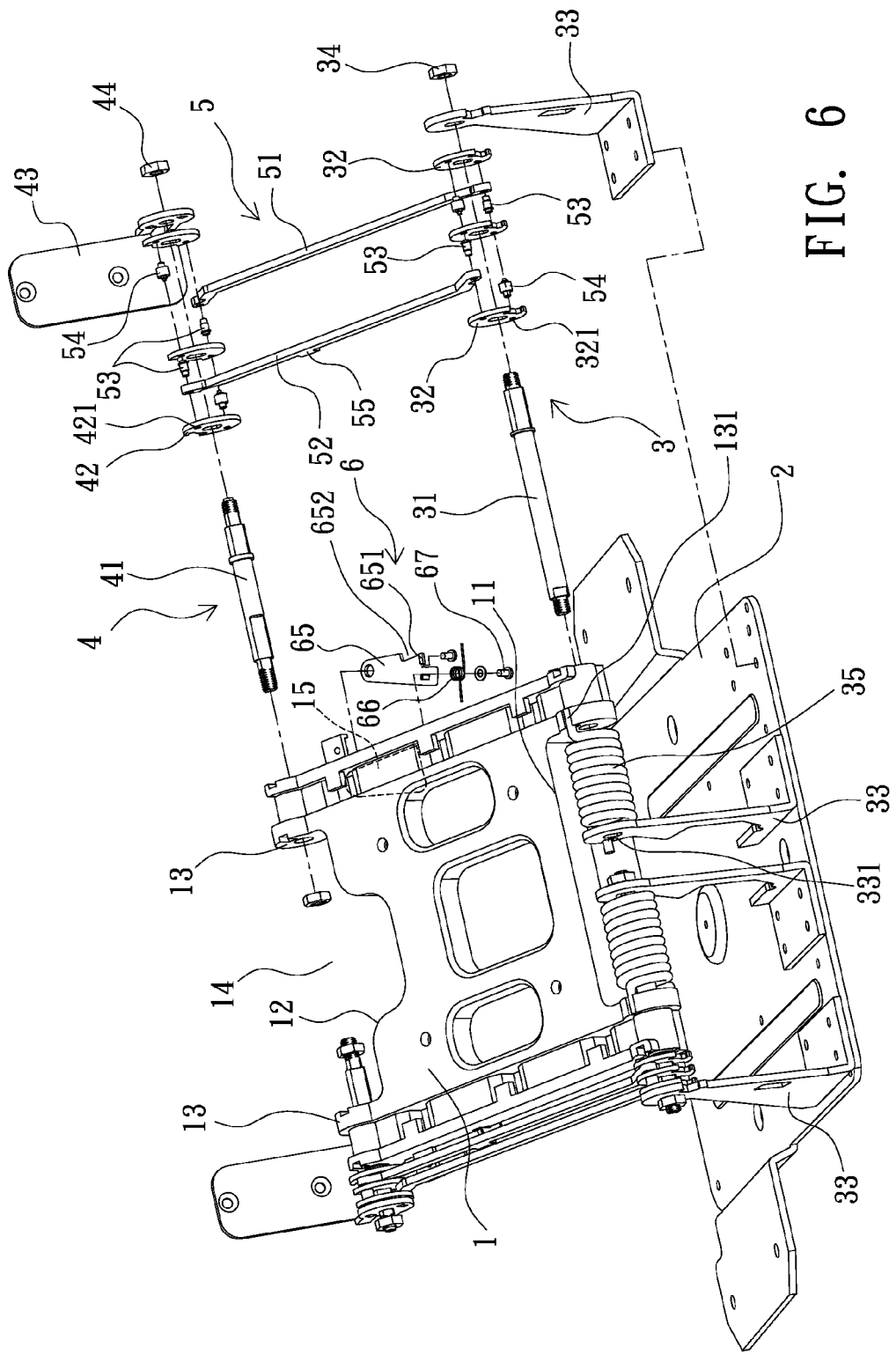
FIG. 6 is a 3D exploded view of the second embodiment of the supporting structure of the present invention.

Referring to FIG. 6, the rod-linkage latching device 6 is provided in the accommodating space 15 of the connecting unit 1, e.g. a concave fan-shaped section having an lateral opening, the latching member 65 is a sheet member, one end thereof is pivotally connected to one end of the fan-shaped section by an pin 67, the other end passes trough a resilient unit 66, e.g. a torsion spring, by another pin 67, and the two ends of the resilient unit 66 are respectively connected to the latching member 65 and the accommodating space 15 for allowing the latching member 65 elastically and retractably swings at the opening of the accommodating space 15, and a stopping member 16 (e.g. an extruding wall) disposed at the pivotal connecting end of the accommodating space 15 is served as a limit for limiting the latching member 65 outwardly swings from the pivotal connecting end. A pulling sheet 651 is vertically extended from the free end of the latching member 65, and a contacting concave slot 652 is formed at the outer end of the latching member 65 for receiving and contacting, e.g. the tenon sheet 55 of the bottom connecting rod 52.

Figure 7:
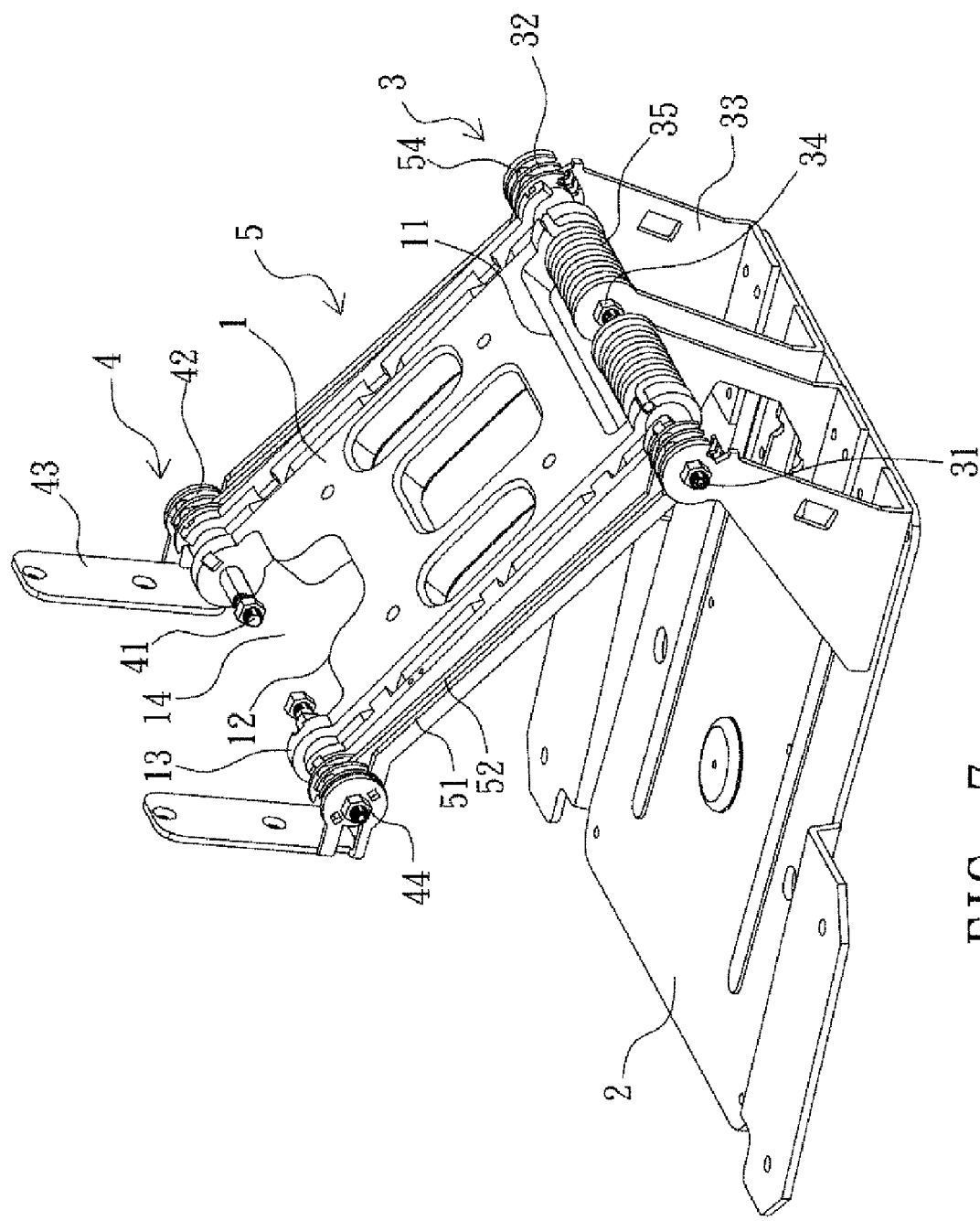
FIG. 7 is a 3D view of the supporting structure after assembled shown in FIG. 6.
Figure 8:
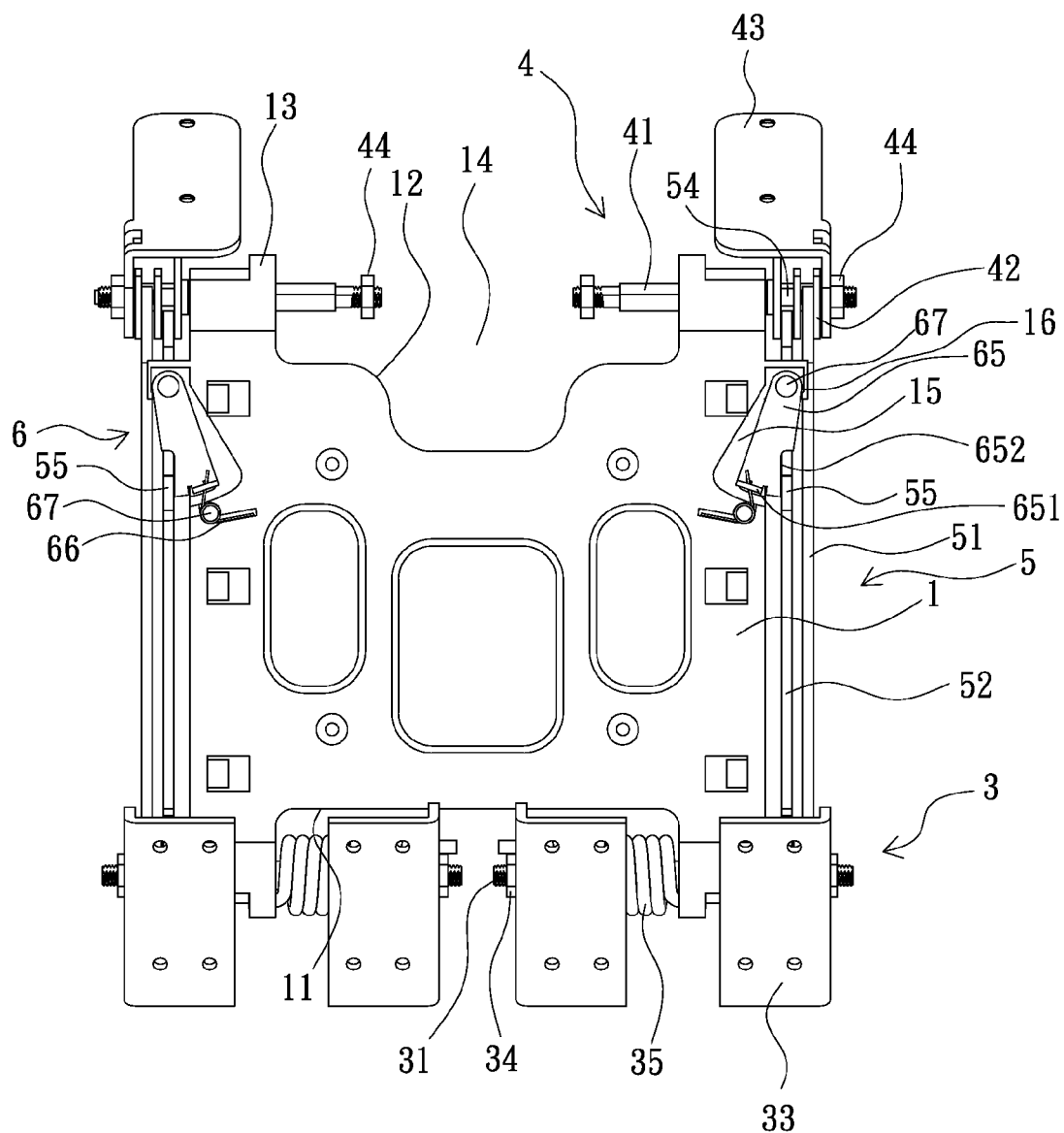
FIG. 8 is a schematic view of the rod-linkage latching device of the second embodiment before performing locking operation to the rod-linkage mechanism.

The supporting structure after assembled of the second embodiment of the present invention is shown at FIG. 7, and the bottom view thereof (not including the base seat 2) is shown in FIG. 8, wherein the tenon sheet 55 of the bottom connecting rod 52 is provided in the contacting concave slot 652 of the latching member 65 for forming a stop for the latching member 65, so the connecting unit 1 has the tilt angle adjusting function with respect to the base seat 2.

Figure 9:
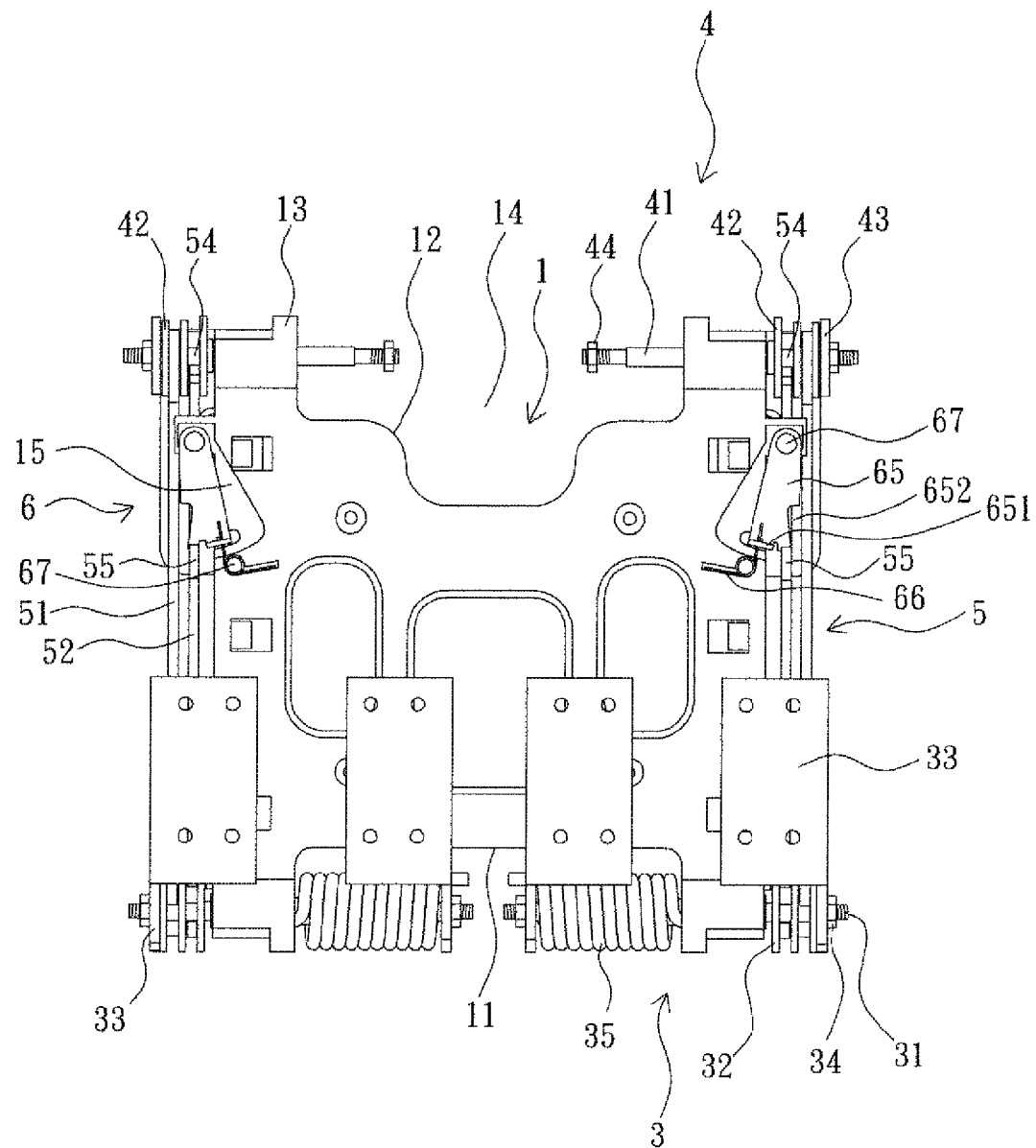
FIG. 9 is a schematic view of the rod-linkage latching device of the second embodiment after performing locking operation to the rod-linkage mechanism.
Figure 10:
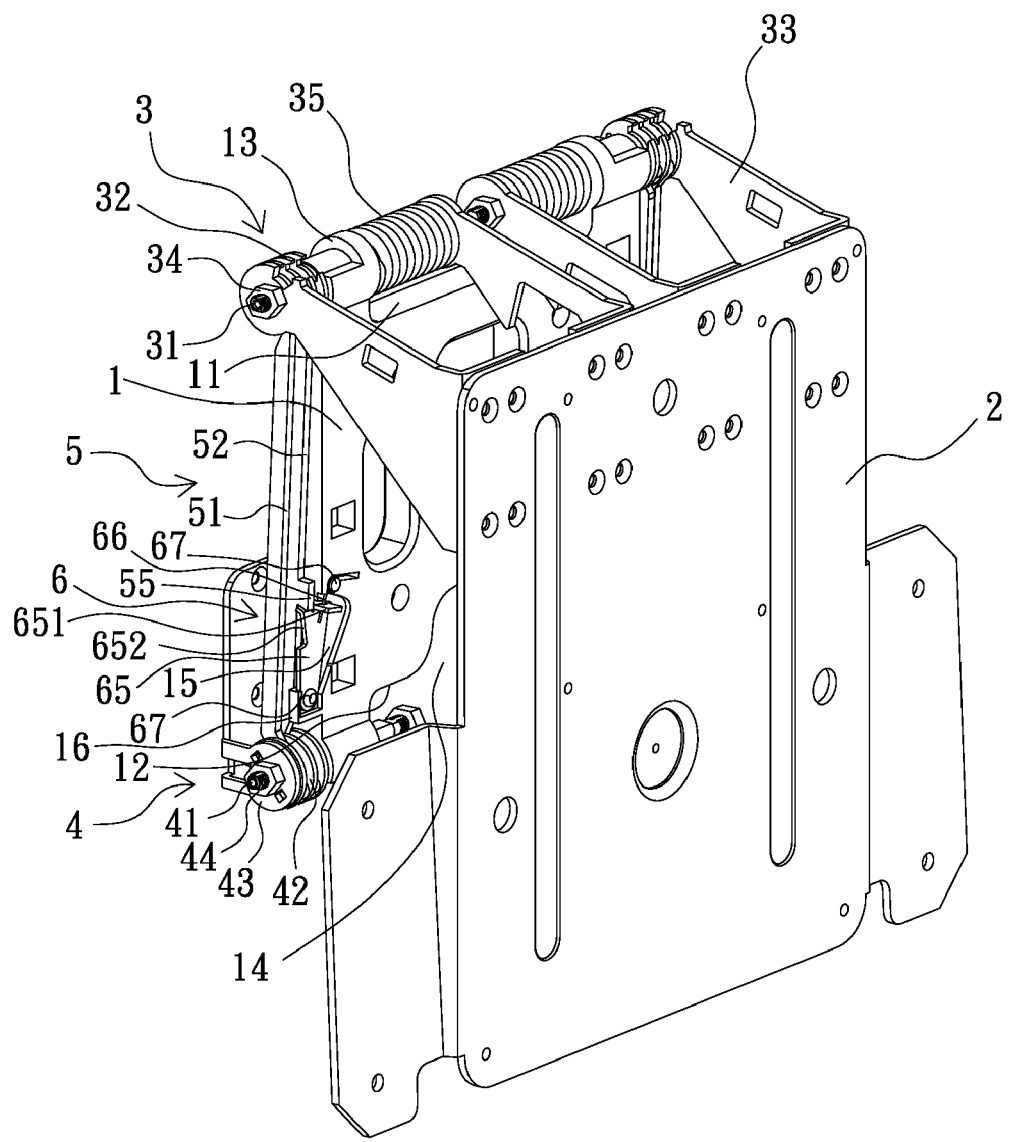
FIG. 10 is a 3D view of the supporting structure after the rod-linkage latching device of the second embodiment performs locking operation to the rod-linkage mechanism.

Referring to FIG. 9 and FIG. 10, if the supporting structure is desired to be hanged on a wall or be packaged, the connecting unit 1 and the base seat 2 are preferably disposed in parallel for saving space, so the connecting unit 1, with the base seat hinge 3 as an axial center, rotates toward the base seat 2; because the rod-linkage mechanism 5 has already limited the swing radius of the upper portion of the connecting unit 1, when swinging, the two connecting rods 51, 52 generate a relative movement in which one is pulling and the other is pushing, so the shaft rods 41 and the three top shaft rings 42 rotate simultaneously and the original angle of the flat panel monitor is not effected because the hole provided on the lugs 13 are round holes. The tenon sheet 55 of the bottom connecting rod 52 moves due to the downward pulling movement thus releases from the contacting concave slot 652, due to the downward movement of the tenon sheet 55, the latching member 65 swings outwardly so a latch is formed, thus the tenon sheet 55 can not move upwardly so a locking status is formed, and the torsion spring 35 disposed between the connecting unit 1 and the base seat 2 is in an energy saving status, so that the connecting unit 1 has a certain angle, e.g. zero degree, with respect to the base seat 2, and the connecting unit 1 and the base seat 2 can be disposed is in parallel.

For releasing the locking status, just inwardly pull the pulling sheet 651 to let the latching member 65 moves inwardly, the tenon sheet 55 is not longer latched by the latching member 65 and energy is released from the torsion spring 35 so the connecting unit 1 is in a tilting status with respect to the base seat 2, and the top and bottom connecting rods 51, 52 generates an movement in which one is pulling and the other is pushing, then the tenon sheet 55 is forced to move upwardly for limiting the swing movement of the latching member 65.

The present invention has overcome the problem that a conventional supporting structure can be only disposed on a plane, and by providing a rod-linkage latching device between a connecting unit and a rod-linkage mechanism the two connecting rods of the rod-linkage mechanism generate a relative movement while the connecting unit performs tilt angle adjusting toward the base seat, so a tenon sheet of one connecting rod is moved and a latching member of the rod-linkage latching device loses stop and extends then the movement of the tenon sheet is limited and a locking status is formed, so a torsion spring disposed between the connecting unit and the base seat are pressed and a energy saving status is formed, therefore the connecting unit has a certain angle with respect to the base seat and an advantage of saving volume while packaging and conveying is achieved, and the supporting structure provided by the present invention can be disposed vertically or be hanged, which is a novel art.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A supporting structure having rod-linkage latching, comprises:
- a connecting unit having a top end and a bottom end, the top end is provided with a concave section having an accommodating space and a lateral end of the concave section has an opening;
- a base seat;
- a base seat hinge rotatably provided between the bottom end of the connecting unit and the base seat, at least one torsion spring is pivotally connected between the connecting unit and the base seat so a tilting angle of the connecting unit can be adjusted with respect to the base seat;
- a main hinge rotatably provided between the top end of the connecting unit and a main supporting rack;
- at least one rod-linkage mechanism provided parallel to the connecting unit and composed by top and bottom connecting rods which are parallel to each other, two ends of each of the connecting rods are respectively pivotally connected to the base seat hinge and the main hinge, and one of the two connecting rods is, with respect to the location of the accommodating space, radially and extrudedly provided with a tenon sheet;
- at least one rod-linkage latching device, a sheet-shaped latching member is pivotally connected to one end of the concave section, two ends of a resilient unit are respectively connected to the latching member and the concave section, so the latching member can elastically and retractably swings at the opening of the concave section, a pulling sheet is vertically extended from the free end of the latching member and the pulling sheet can reversely press the resilient unit, and a contacting concave slot capable of elastically contacting and receiving is formed at the outer end of the latching member;
- with the rotation movement of the connecting unit moving toward the base seat, the movement can be converted into a tilt movement of the main supporting rack, so the relative movement generated by the top and the bottom connecting rods allows the tenon sheet simultaneously moves, therefore the contacting concave slot of the latching member loses a stop from the tenon sheet then extends, and the tenon sheet is latched for forming a locking status, so the torsion spring disposed between the connecting unit and the base seat is pressed so an energy saving status is formed, and the connecting unit has a certain angle with respect to the base seat.

2. The supporting structure having rod-linkage latching as claimed in claim 1, wherein the outer side of the concave section is provided with a stopping member, which is an extruding wall, the stopping member is served as limit for limiting the latching member outwardly swing at the pivotal connecting end.

3. The supporting structure having rod-linkage latching as claimed in claim 1, wherein top and bottom ends of the top and the bottom connecting rods are respectively axially connected to a shaft pin for pivotally connecting to top and bottom shaft rings of the main hinge and the base seat hinge; wherein the top and the bottom ends of the top and the bottom connecting rods are respectively placed in between three top shaft rings and three bottom shaft rings, and two radial ends of the top and the bottom shaft rings are respectively provided with a ring hole for respectively receiving the shaft pins of the top and the bottom connecting rods, the adjacent ring holes, that are not pivotally connected, of each two adjacent shaft rings are respectively pivotally provided with an interpose pin.

4. The supporting structure having rod-linkage latching as claimed in claim 1, the base seat hinge is that the end located at the shaft rod passes through the bottom end of the connecting unit, and the torsion spring is provided in the concave section of the bottom end, the other end passes through at least one bottom shaft ring, a first bottom supporting rack provided on the base seat, the outer end of the shaft rod is combined with an end sealing member.

5. The supporting structure having rod-linkage latching as claimed in claim 4, the base seat hinge is further provided with a second bottom supporting rack provided at an inner side of the torsion spring and on the base seat, the top end of the second bottom supporting rack is served to position the shaft rods, and two ends of the torsion spring are respectively retained at the second bottom supporting rack and the bottom end of the connecting unit.

6. The supporting structure having rod-linkage latching as claimed in claim 1, the main hinge is that the end located at the shaft rod passes through the top end of the connecting unit, the other end passes through at least one top shaft ring and a top supporting rack, and two ends of the shaft rod are respectively combined with an end sealing member.

7. The supporting structure having rod-linkage latching as claimed in claim 4, a pair of lugs is respectively extended from two lateral ends of the top end and the bottom ends of the connecting unit, and each pair of the lugs individually has a concave section.

* * * * *